United States Patent
Bauer et al.

(10) Patent No.: US 8,706,444 B2
(45) Date of Patent: Apr. 22, 2014

(54) METHOD FOR ACCURATELY ACQUIRING MULTIPLE ANALOG INPUT SIGNALS, ANALOG INPUT CIRCUIT, AND MEASURING SENSOR AND MEASURING TRANSDUCER HAVING AN ANALOG INPUT CIRCUIT OF THIS TYPE

(75) Inventors: Daniel Bauer, Waldbronn (DE); Eric Chemisky, Soultz sous forets (FR); Sabine Eckthaler, Rheinzabern (DE); Michael Geppert, Ottersweier (DE); Ulrich Hahn, Lebach (DE); Robin Pramanik, Karlsruhe (DE); Simon Rohrbach, Karlsruhe (DE); Peter Schmith, Karlsruhe (DE); Kurt Schulmeister, Gaggenau (DE); Martin Spatz, Landau (DE); Ralf Walter, Waghäusel (DE)

(73) Assignee: Siemens Aktiengesellschaft, Munich (DE)

(*) Notice: Subject to any disclaimer, the term of this patent is extended or adjusted under 35 U.S.C. 154(b) by 881 days.

(21) Appl. No.: 12/809,336

(22) PCT Filed: Dec. 18, 2008

(86) PCT No.: PCT/EP2008/067957
§ 371 (c)(1),
(2), (4) Date: Sep. 23, 2010

(87) PCT Pub. No.: WO2009/077609
PCT Pub. Date: Jun. 25, 2009

(65) Prior Publication Data
US 2011/0043189 A1 Feb. 24, 2011

(30) Foreign Application Priority Data
Dec. 19, 2007 (DE) .......................... 10 2007 061 282

(51) Int. Cl.
*G06F 17/18* (2006.01)
*H03F 99/00* (2009.01)

(52) U.S. Cl.
USPC ............ 702/179; 702/189; 702/193; 702/199

(58) Field of Classification Search
USPC ........... 702/117, 179, 189, 193, 199; 324/119
See application file for complete search history.

(56) References Cited

U.S. PATENT DOCUMENTS

| 4,125,894 A | 11/1978 | Cashel et al. |
| 4,810,953 A | 3/1989 | Huynh |

(Continued)

FOREIGN PATENT DOCUMENTS

EP 0 756 427 1/1997

OTHER PUBLICATIONS

WO 2004/100381.*

*Primary Examiner* — Michael Nghiem
*Assistant Examiner* — Alexander Satanovsky
(74) *Attorney, Agent, or Firm* — Cozen O'Connor

(57) ABSTRACT

A method for accurately acquiring multiple analog input signals that are converted using a plurality of A/D converters into corresponding digital single measured values. A first measurement averaging cycle having a predetermined total number of measuring intervals is predetermined by a higher-order control unit. First and second input signals are acquired by first and second A/D converters in a first and second number of measuring intervals, the second number being smaller than the first number. The first and second input signals are averaged to form first and second measured values, respectively. The first input signal is acquired by the second A/D converter in a third number of measuring intervals as at least one further single measured value. A message is output if a deviation of the at least one further single measured value from a single measured value of the first input signals measured by the first A/D converter or from the first measured values averaged up to that point exceeds a maximum permissible absolute value of the deviation.

15 Claims, 5 Drawing Sheets

(56) References Cited

U.S. PATENT DOCUMENTS

| | | | |
|---|---|---|---|
| 5,329,818 A * | 7/1994 | Frick et al. | 73/708 |
| 5,412,386 A * | 5/1995 | Sezi | 341/141 |
| 5,745,384 A * | 4/1998 | Lanzerotti et al. | 702/191 |
| 5,801,645 A | 9/1998 | Erickson et al. | |
| 6,304,832 B1 | 10/2001 | Andermo et al. | |
| 6,539,293 B2 * | 3/2003 | Bachtiger et al. | 701/20 |
| 7,859,247 B2 * | 12/2010 | Gianola et al. | 455/522 |
| 8,073,075 B2 * | 12/2011 | Matsuoka et al. | 375/297 |

* cited by examiner

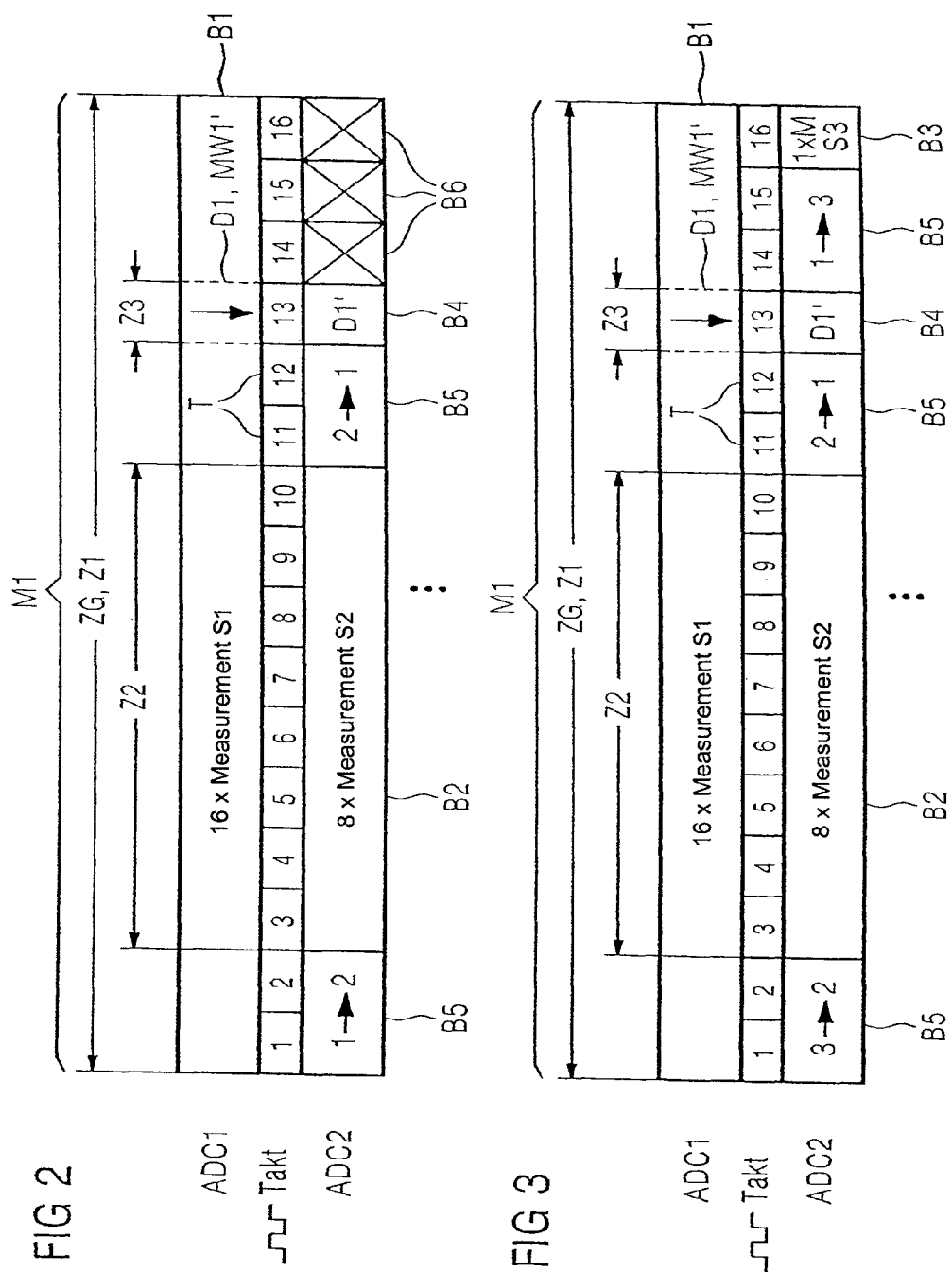

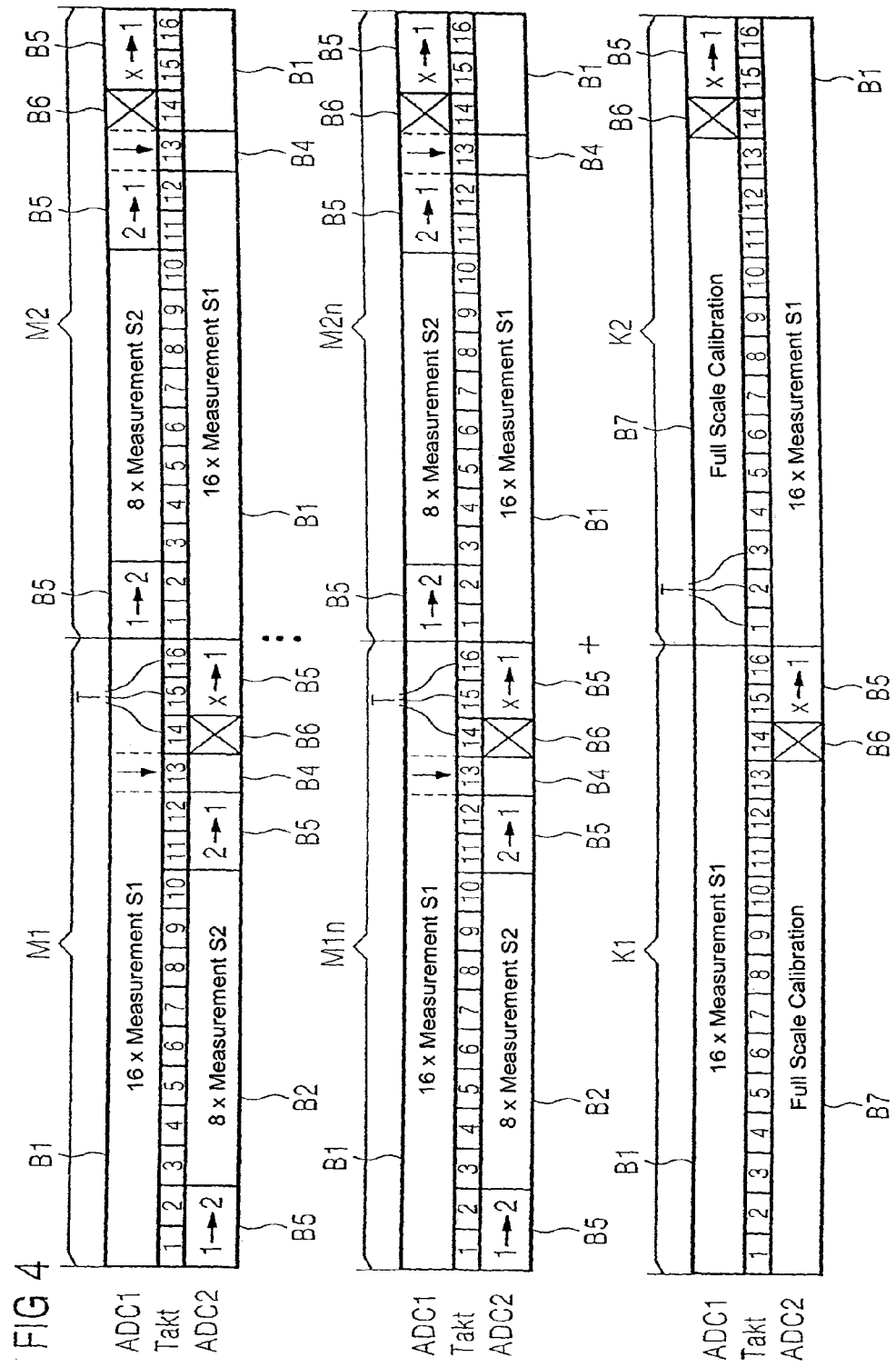

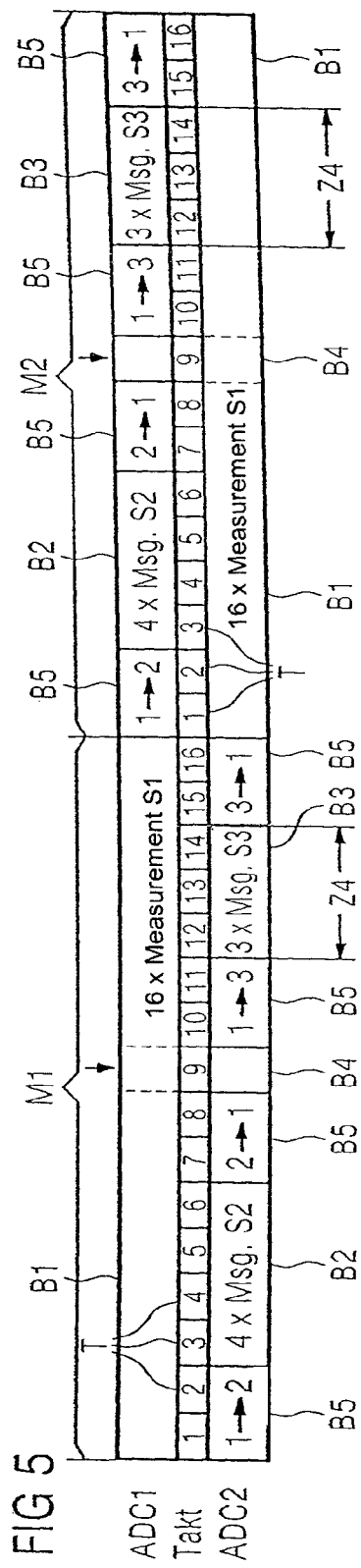

METHOD FOR ACCURATELY ACQUIRING MULTIPLE ANALOG INPUT SIGNALS, ANALOG INPUT CIRCUIT, AND MEASURING SENSOR AND MEASURING TRANSDUCER HAVING AN ANALOG INPUT CIRCUIT OF THIS TYPE

CROSS-REFERENCE TO RELATED APPLICATIONS

This is a U.S. national stage of International Application No. PCT/EP2008/067957, filed on 18 Dec. 2008. Priority is claimed on German Application No. 10 2007 061 282.8, filed on 19 Dec. 2007. The entire content of both applications is incorporated herein by reference.

BACKGROUND OF THE INVENTION

Field of the Invention

The invention relates to monitoring systems and, more particularly, to a method for accurately acquiring multiple analog input signals which are converted using first and second A/D converters into corresponding digital single measured values.

The invention also relates to an analog input circuit having electrical inputs for multiple analogue input signals, comprising a measured value output for outputting corresponding measured values and comprising a messaging output for outputting a message, such as an error or warning message. The analog input circuit comprises a higher-order control unit, two A/D converters and at least one preceding activatable multiplexer for switching at least some of the input signals to the respective A/D converter using the control unit.

The invention additionally relates to a measuring sensor and a measuring transducer, in particular for operation at a two-core current loop. The measuring sensor and the measuring transducer each comprise multiple sensor units for acquiring physical measured quantities, such as pressure, force or temperature, and at least one analog input circuit of this type for acquiring corresponding analog input signals originating from the respective sensor units.

The analog input signals can in principle originate from any signal sources, such as from a measuring sensor or an audio or video source.

The focus of the present application are methods in which physical quantities, such as pressure, temperature, force flow, are acquired as measured quantities. The measured quantities typically originate from sensor units, such as from a pressure, temperature, force or flow sensor. The sensor units can be integrated for example in a measuring sensor or in a measuring transducer or be connected thereto. A measuring transducer is a field device which is typically used in plant and automation engineering, such as in the chemical industry, petrochemistry and/or in mining. Measuring transducers of this kind, such as the SITRANS P model manufactured by Siemens, are operated to transmit a measured value to a two-core current loop. The measuring transducer is also supplied with electrical power to energize the electronic circuits by the same two-core current loop.

Measuring sensors and measuring transducers of this type conventionally comprise one or more analog input circuit(s) which take(s) the measurements using appropriate measuring methods. For this purpose, the analog input circuits comprise one or more analog/digital (A/D) converters. The A/D convertors convert an applied analog input signal or measuring signal into a corresponding digital measured value. The accuracy of an input signal that is to be acquired can be increased by averaging multiple single measured values. If acquisition of multiple input signals is envisaged then an analog multiplexer can be connected upstream of the A/D converter. This analog multiplexer can be activated, for example, by a higher-order control unit, such as a microcontroller, to select the desired measuring channel. Alternatively, the multiplexer can be pre-integrated in the A/D converter. In this case, the A/D converter comprises multiple signal inputs for the analog input signals.

Highly accurate and at the same time fast measurements are required for the acquisition of the measured quantities mentioned in the introduction with the measuring sensors and measuring transducers, such as for exact control of industrial or chemical processes in the case of a drop in pressure, to be able to quickly intervene in the procedure. Measuring sensors and measuring transducers, of which high operational safety and reliability demands are made in terms of operating safety moreover, also increasingly require certification, such as in accordance with the Safety Integrity Level (SIL) standard to IEC 61508.

To meet the requirements of this standard, it is known to construct the measuring sensors and measuring transducers in a redundant manner. Drawbacks of this solution are the large space requirement and the high costs due to duplicate or even multiple implementation. Measuring devices are also known which meet the above standard and are also designed so as to be non-redundant. Measuring devices of this type are very expensive, however, because the required A/D converters have to be very fast, secure and at the same time highly accurate. Special A/D converters of this type cost a great deal more than conventional A/D converters, which comparatively are either fast and less accurate or highly accurate and slow. The costs for the special A/D converters are often many times that of commercial A/D converters which are produced in large quantities. It should also be taken into account that the sampling rate is drastically reduced by multiplexing the analog input signals. In the case of conventionally used sigma-delta converters, the sampling rate can even be reduced by a factor 6, even if, for example, two or three input signals are "multiplexed". The reason for this is due to the required settling time of the filters in the input circuit of the A/D converters.

SUMMARY OF THE INVENTION

It is therefore an object of the invention to provide a method for accurately acquiring multiple analog input signals and an analog input circuit for performing the method.

It is further object of the invention is to provide a suitable measuring sensor and a suitable measuring transducer having an analog input circuit of this type.

These and other objects and advantages are achieved in accordance with invention by a method for accurately acquiring multiple analog input signals which are converted using two A/D convertors into corresponding digital single measured values.

These and other objects and advantages are achieved in accordance with the invention by a method for accurately acquiring multiple analog input signals which are converted using two A/D converters into corresponding digital single measured values. Here, a first measurement averaging cycle having a predetermined total number of measuring intervals is predetermined by a higher-order control unit. The A/D converters can be switched to at least a part of the input signals using at least one multiplexer, which can be activated by the control unit. Within the first measurement averaging cycle respectively a first input signal is acquired by the first A/D converter in a first number of measuring intervals, which preferably corresponds to the total number, and is cumulatively averaged by the control unit to form a first measured value. A second input signal is acquired by the second A/D converter in a lesser number of measuring intervals than the first number and cumulatively averaged to form a second measured value. The first input signal is acquired by the second A/D converter in a third number of measuring intervals, preferably in only one measuring interval, as at least one further single measured value. A message is output if a deviation of the at least one further single measured value (D1') from the single measured value (D1), which is synchronously acquired by the first A/D converter (2), or from the first measured values (MW1') averaged up to that point exceeds a maximum admissible absolute value of the deviation.

Due to targeted activation of two "conventional" A/D converters, comparatively fast, the invention advantageously permits secure and at the same time highly accurate measurement of the analog input signals. For this purpose, a first analog input signal, which requires monitoring, as the carrier of a principal measured quantity, is averaged by one of the two A/D converters in a large number of measuring intervals to form a highly accurate digital measured value.

This input signal is also simultaneously "co-measured" once or several times "in between" by the other of the two A/D converters to check the same two input signals for deviations from each other. As a result, it is advantageously possible to very quickly identify a sudden change in the first sensor signal, such as a pressure value or a flow value in the case of a drop in pressure. A higher-order process-control computer for example can then immediately intervene in the control engineering process.

In accordance with the invention, it is also possible to immediately determine, from the comparison of the measured values of the two A/D converters, whether an accurate measured value acquisition is still possible within specified tolerance limits. Here, an inadmissible deviation is an accurate indicator of failure or of incorrect operation of one of the two A/D converters. These failures occur in the case of a significant measured value deviation.

Simultaneous, but extremely improbable, failure of both A/D converters in the sense of a double error will not be considered any further here. If it is also necessary to exclude an error of this kind then, for example, two technically differently designed A/D converters, i.e., from different manufacturers, can be used to drastically reduce the probability of the occurrence of a systematic error. Alternatively or additionally, a third A/D converter can be provided to achieve even greater security in the sense of a 2 out of 3 decision.

The two A/D converters, which are variable with respect to each other in terms of their accuracy and speed, are for example voltage-frequency (U-f) converters, sigma-delta converters or dual slope converters. The two converters are wired to each other such that they can convert all input signals to be acquired. The wiring can be implemented by a common analog multiplexer. The convertor can be implemented using a respective multiplexer which is connected upstream of an A/D converter. In addition, the multiplexer can be pre-integrated in the A/D converter. Both A/D converters can be integrated in a common electronic component along with the multiplexer. Alternatively, the function of a component of this type can form part of a control unit, such as a microcontroller.

In an embodiment of the method of the invention, a second measurement averaging cycle having the same total number of measuring intervals is predetermined by the higher-order control unit. Here, the allocation of the A/D converters to the analog input signals is changed after each measurement averaging cycle.

The advantage of the presently contemplated embodiment of the method of the invention resides in the fact that the A/D converter that is not working correctly can respectively be determined by the control unit. In this case an exact error message can be output to a monitoring device or a computer, for example.

In accordance with a further embodiment of the method, at least one multiplexer is activated by the higher-order control unit such that, in addition to the second input signal, a third input signal or further input signals are acquired by the respective A/D converter in the remaining measuring intervals of a respective measurement averaging cycle and are cumulatively averaged by the higher-order control unit to form a third measured value or further measured values.

The third sensor can, for example, be a temperature sensor which can be used to correct the first input signal by compensating for temperature errors. In particular, the third sensor is not used for the acquisition of a principal measured quantity.

In a further embodiment of the method, at least one calibration cycle is predetermined for the first and second A/D converters by the higher-order control unit after a predetermined number of measurement averaging cycles.

In an alternative embodiment, a calibration cycle is alternately predetermined by the higher-order control unit for the first or second A/D converter after a predetermined number of measurement averaging cycles.

An identical total number of measuring intervals, which corresponds to the measurement averaging cycles, is in each case preferably predetermined by the higher-order control unit for a calibration cycle. The calibration cycle or cycles are used to compensate for drifting of the measured values over time, for example, due to temperature effects.

The object of the invention is also achieved by an analog input circuit having electrical inputs for multiple analog input signals. Here, the input circuit comprises a measured value output for outputting corresponding measured values and a messaging output for outputting a message, i.e., an error message or a signal-change message. The analog input circuit comprises a higher-order control unit, two A/D converters and at least one preceding activatable multiplexer for switching at least a part of the input signals to the respective A/D converter using the control unit. The control unit characteristically comprises a device for performing the method in accordance with the invention and an output device for the measured values and messages.

An input circuit in accordance with the invention is advantageously configured so as to be redundant only with respect to the measured section from signal input to signal output. A duplicated implementation of the sensor units or measuring points is advantageously omitted. The division into "nested" cycles means it is possible to achieve monitoring and at the same time avoid losses in speed by dispensing with time-consuming multiplexing within one of these cycles. As a result, it is possible to use inexpensive A/D converters, which it would not be possible to use in independent operation or without the nested cycles.

The object of the invention is also achieved by a measuring sensor having multiple control units for acquiring physical quantities such as pressure, force, temperature or the like. The measuring sensor comprises at least one inventive analog input circuit for the acquisition of corresponding analog input signals originating from the respective sensor units.

The object of the invention is additionally achieved by a measuring transducer which is provided in particular for operation at a two-core current loop. The two-core current loop is in particular a standardized 4-20 mA two-core current loop that is common in the industrial sector and in the plant sector. A measuring transducer of this type has multiple sensor units, preferably in integrated form, for acquiring physical quantities such as pressure, force or temperature.

The measuring transducer comprises at least one analog input circuit in accordance with the invention for acquiring corresponding analog input signals originating from the respective sensor units.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention and advantageous embodiments of the invention will be described in more detail hereinafter with reference to the following drawings, in which:

FIG. 2 is a timing diagram of a first measurement averaging cycle in accordance with an embodiment of the method of the invention;

FIG. 3 is a timing diagram of a first measurement averaging cycle in accordance with an alternative embodiment of the method of the invention;

FIG. 4 is a timing diagram of first and second measurement averaging cycles in accordance with an embodiment of the method of the invention;

FIG. 5 is a timing diagram of first and second measurement averaging cycles in accordance with an embodiment of the method of the invention.

DETAILED DESCRIPTION OF THE PREFERRED EMBODIMENTS

Figure 1:
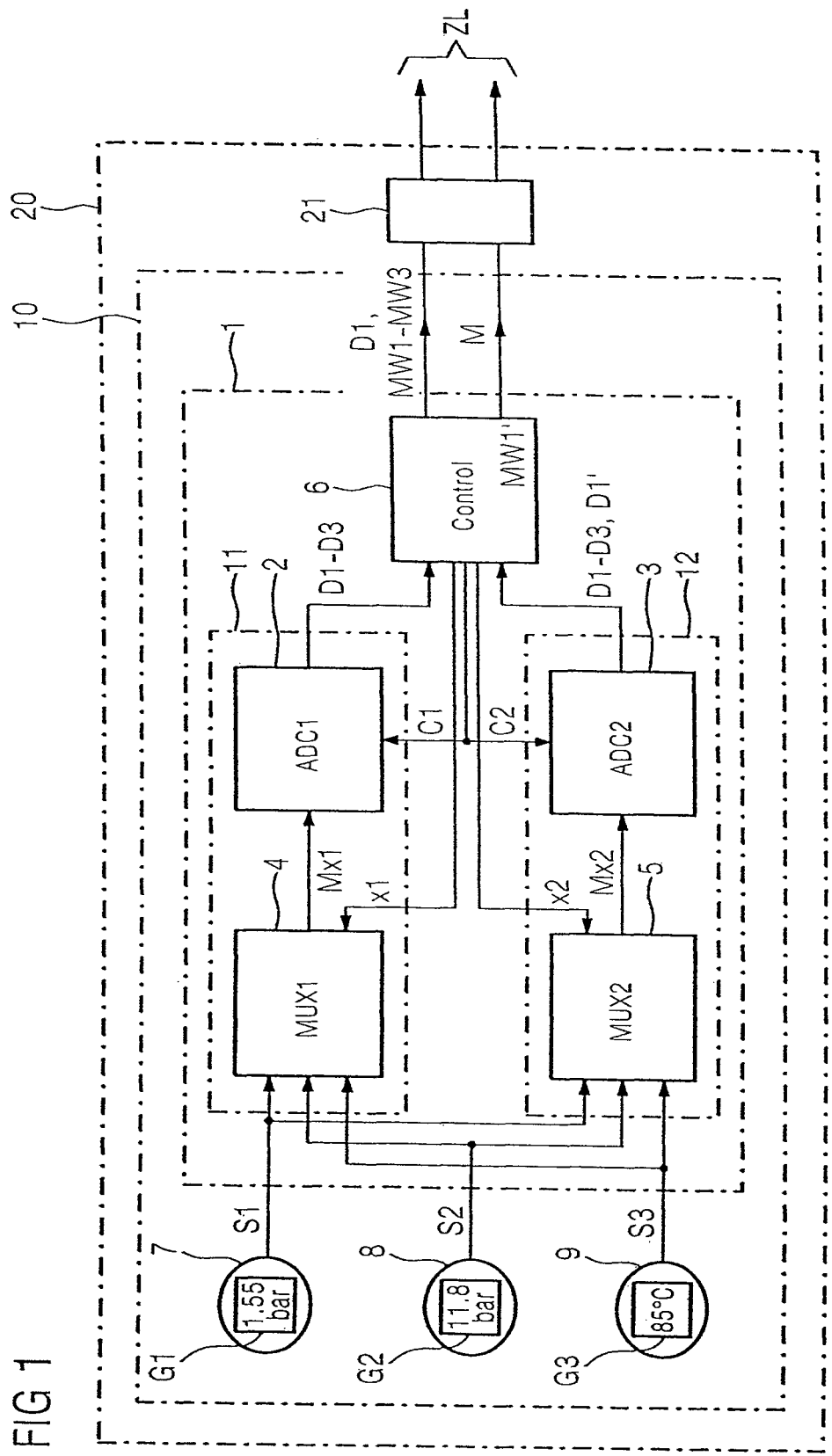
FIG. 1 is a schematic block diagram of an analog input circuit for acquiring multiple analog input signals having a control unit for performing the method, and a measuring sensor and a measuring transducer in accordance with the invention.

FIG. 1 shows an analog input circuit 1 for acquiring multiple analog input signals S1-S3 having a control unit 6 for performing the method in accordance with the invention, and a measuring sensor 10 and a measuring transducer 20.

The left-hand part of FIG. 1 shows exemplary three sensor units 7, 8, 9 which provide analog input signals S1-S3 as measuring signals for the following analog input circuit 1. The first sensor unit 7 is, for example, a differential pressure gauge which, according to the example in FIG. 1, acquires a differential pressure as a principle measured quantity G1 in the form of a first input signal S1. In the example of FIG. 1, the principal measured quantity G1 has the exemplary value of 1.55 bar. This principle measured value G1 is reliably monitored with a high level of measuring accuracy and at very short intervals using the input circuit 1.

The exemplary second sensor unit 8 is an absolute pressure gauge. The second sensor 8 acquires an absolute pressure value as measured quantity of G2, in the example of FIG. 1 a value of 11.8 bar, in the form of a second input signal S2 or measuring signal. The measured quantity G2 acquired by the second sensor unit 8 can, for example, be used to correct the principal measured quantity G1 acquired by the first sensor unit 7. The left-hand lower part of FIG. 1 shows a temperature sensor unit 9 which, for example, acquires a temperature of 85° as the third measured quantity G3. It may also be used to correct the principal measured value G1.

The analog input signals S1-S3 are supplied to two multiplexers 4, 5 which switch the respective analog input signals S1-S3 as a function of corresponding switching signals X1, X2 to the respective following A/D converters 2, 3. Reference characters MX1, MX2 designate multiplexed input signals. To activate the multiplexers 4, 5, the switching signals X1, X2 are connected to a control unit 6, preferably to a microcontroller. The signaling of the control unit 6 is also connected to the two A/D converters 2, 3 to adjust the various operating modes of the A/D converters 2, 3 using appropriate control signals C1, C2. As shown by way of example in FIG. 1, one multiplexer 4, 5 respectively can form an electronic unit 11, 12, with one of the A/D converters 2, 3. This is shown using by broken lines in the example in FIG. 1. The two A/D converters 2, 3 provide digital single measured values D1-D3 at the output side. These are acquired by the control unit 6 and handled by a computer accordingly. At the output side the control unit 6 provides digital measured values MW1-MW3 corresponding to the measured quantities G1-G3 and first single measured values D1 at a measured value output. The first single measured values D1 can be used for fast control by a higher-order process controller, for example. An error message M or a signal-change message comprising a warning message can then be tapped at a messaging output.

The sensor units 7, 8, 9 and the analog input circuit 1 in accordance with the invention are combined in the example of FIG. 1 to form a measuring sensor 10. All components can be arranged, for example, on a printed circuit board. Reference numeral 20 designates a measuring transducer which, moreover, comprises a two-core connector unit 21. This converts the digital measured values MW1-MW3, the digital single measured values D1 and the messages M into, for example, frequency shifted Highway Addressable Remote Transducer (HART®) fieldbus signals. An analog fieldbus system, which is based on a standardized 4-20 mA two-core current loop ZL, can be expanded using HART® communication of this kind. HART® is a common, standardized communication system for establishing industrial digital field busses. HART® allows digital communication between multiple users (field devices) through a common digital field bus using the two-core current loop ZL in accordance with the older 4-20 mA standard. Existing lines to the 4-20 mA standard can be used directly and both systems operated simultaneously. Alternatively or additionally, one of the digital measured values MW1-MW3 can be transmitted through this two-core current loop ZL by impressing appropriate current loop values into the two-core current loop ZL using the two-core connector unit 21.

FIG. 2 shows a first measurement averaging cycle M1 in accordance with an embodiment of the method of the invention.

In accordance with the contemplated embodiments of the invention, a first measurement averaging cycle M1 having a predetermined total number ZG of measuring intervals T is specified. A measuring interval T is typically the minimum period that an A/D converter 2, 3 needs to convert an analog input quantity S1-S3 into a digital single measured value D1-D3. Preferably, a measurement averaging interval M1 has a total number ZG of measuring intervals T in the region of eight to 32. In special cases, the total number ZG can also be less than this, such as six, or more than this, such as 40.

The upper part of FIG. 2 shows an exemplary measuring block B1 extending over 16 measuring intervals T. Within the first measurement averaging cycle M1, a first input signal S1 is acquired by the first A/D converter 2 in a first number Z1 of measuring intervals T. The first input signal S1, which is associated with a principal measured quantity G1, is preferably acquired in a large part of the available total number ZG of measuring intervals T, such as with a first number Z1 of measuring intervals T in a region from 12 to 16. In the example of FIG. 1, the first number Z1 corresponds to the total number ZG of measuring intervals T, so the first input signal S1 can be continuously acquired. One digital single measured value D1 acquired per measuring interval T respectively is cumulatively averaged by the control unit 6 (see FIG. 1) to form a first measured value MW1. Here, "cumulatively" means that the respective single measured values D1-D3 are acquired by the control unit 6 after each measuring interval T and are averaged with increasing measuring accuracy to form a respective measured value MW1-MW3.

A second input signal S2, which is associated with a second measured quantity G2, is also acquired by the second A/D converter 3 in a lesser number Z2 of measuring intervals T than the first number Z1. The respective digital single measured values D2 are cumulatively averaged by the control unit 6 to form a second measured value MW2. The second number Z2 of measuring intervals T corresponds approximately to 40%-60% of the total number ZG of measuring intervals T. In the example of FIG. 2, the second input signal S2 is measured in an exemplary second measuring block B2 which extends from the third to the tenth measuring intervals T.

Reference character B5 designates switching blocks which are required to switch the analog input signals S1-S3 to the respective A/D converter 2, 3. Filter settling processes, in particular in the input circuit of the two A/D converters 2, 3, are decisive for the required switching times. In the example of FIG. 2, two measuring intervals T are required to switch from one input signal S1-S3 to another input signal S1-S3. It should be readily appreciated that frequent switching of the measuring channels leads to a drastically reduced effective measured data rate of the respective A/D converter 2, 3. In the example of FIG. 2, the first input signal S1 is switched to the second input signal S2 at the second A/D converter 3 in switching block B5 during the first and second measuring intervals T. Once the second input signal S2 has been measured in the second measuring block B2, the second input signal S2 is switched to the first input signal S2 in another switching block B5.

In accordance with the contemplated embodiments of the invention, the first input signal S1 is now acquired synchronously with the first A/D converter 2 by the second A/D converter 3 in a third number Z3 of measuring intervals T as at least one further single measured value D1'. In the example of FIG. 2, synchronous acquisition of a first single measured value D1 and a further single measured value D1' occurs in a single measuring interval T. In the example of FIG. 2, this measuring interval T is identified by an arrow as comparison block B4. Compared with the available total number ZG of measuring intervals T, the third number Z3 of measuring intervals T has a number in the region of 5%-10% of the total number ZG of measuring intervals T. Preferably only a single measuring interval T in each case is provided for synchronous acquisition. Alternatively, the acquisition can also be made in a further, subsequent measuring interval T, it then being possible for the respective further first single measured value D1' to be averaged to form a common first further single measured value D1'. By way of example, two individual measuring intervals T may also be used for simultaneous synchronous comparison, with these preferably being temporally distributed as comparison blocks B4 over a measurement averaging cycle M1 such that roughly one third of the total number ZG of measuring intervals T lies between two such comparison blocks B4.

In accordance with the contemplated embodiments of the invention, a message M is output if the at least one further single measured value D1' exceeds the single measured value D1 acquired simultaneously by the first A/D converter 2 by a maximum admissible deviation. The admissible deviation can lie, for example, in a range from 0.1% to 3% of the available measured value range. Alternatively, the message M is output if the deviation of the at least one further single measured value D1' from the first measured value MW1' averaged up to that point exceeds a maximum admissible deviation.

Reference character B6 designates power-saving blocks. During this time, measured value acquisition by the second A/D converter 3 rests. The power consumption of the analog input circuit 1 in accordance with the contemplated embodiments of the invention is consequently advantageously reduced in these measuring intervals T that are not required. The measurement averaging cycle M1 shown in the example of FIG. 2 is cyclically repeated, as indicated by the three dots.

FIG. 3 shows a first measurement averaging cycle M1 in accordance with an embodiment of the method of the invention.

In contrast to the example in FIG. 2, in addition to the second input signal S2, a third input signal S3 is acquired by the respective A/D converter 2, 3 in the remaining measuring intervals T of the illustrated measurement averaging cycle M1 in a measuring block B3. This is cumulatively averaged by the higher-order control unit 6 to form a third measured value MW3.

FIG. 4 shows first and second measurement averaging cycles M1, M2 in accordance with an alternative embodiment of the method of the invention.

In accordance with the contemplated embodiment, a second measurement averaging cycle M2 with the same total number ZG of measuring intervals T is predetermined by the higher-order control unit 6 (see FIG. 1). The allocation of the A/D converters 2, 3 to the analog input signals S1-S3 is changed after each measurement averaging cycle M1, M2. Reference characters M1n, M2n designate the cyclical continuation of the measurement averaging cycles M1, M2. The particular advantage of this changing arrangement is that an A/D converter 2, 3 that is not working correctly can be directly determined by the higher-order control unit 6. This increases the reliability of the analog input circuit 1 of the presently contemplated embodiment in comparison to the previously described embodiment.

In the lower part of FIG. 4, two calibration cycles K1, K2 follow the previous measurement averaging cycles M1, M2, M1n, M2n. In the example illustrated in FIG. 4, an identical total number ZG of measuring intervals T, which corresponds to the measurement averaging cycles M1, M2 in each case, is predetermined by the higher-order control unit 6 for a calibration cycle K1, K2. As a result, the two A/D converters 2, 3 are calibrated after a predetermined number, i.e., a number of n measuring intervals T. The alternate execution of calibration has the advantage that the first input signal S1 belonging to the principal measured quantity G1 is still continuously acquired.

FIG. 5 shows first and second measurement averaging cycles M1, M2 in accordance with another embodiment of the method of the invention.

In the presently contemplated embodiment, the analog input signals S1-S3 are again acquired alternately by the two A/D converters 2, 3. Compared with the preceding Figures, FIG. 2 to FIG. 4, the second input signal S2 is acquired in, for example, four measuring intervals T and a third input signal S3 acquired in three measuring intervals T.

Here, it is essential that the first input signal S1, which is associated with a principal measured quantity G1, is preferably determined over the entire temporal range of a measurement averaging cycle M1, M2 in each case. Meanwhile, the first sensor signal S1 is synchronously acquired at least once or even several times by the second A/D converter 3. The two digital single measured values D1, D1' are then preferably compared with each other within a measuring interval T to be able to establish an inadmissible deviation from each other as early as possible. Here, a message M is output which indicates an error in the measured value acquisition or a very fast change in the first input signal S1.

Figure 6:
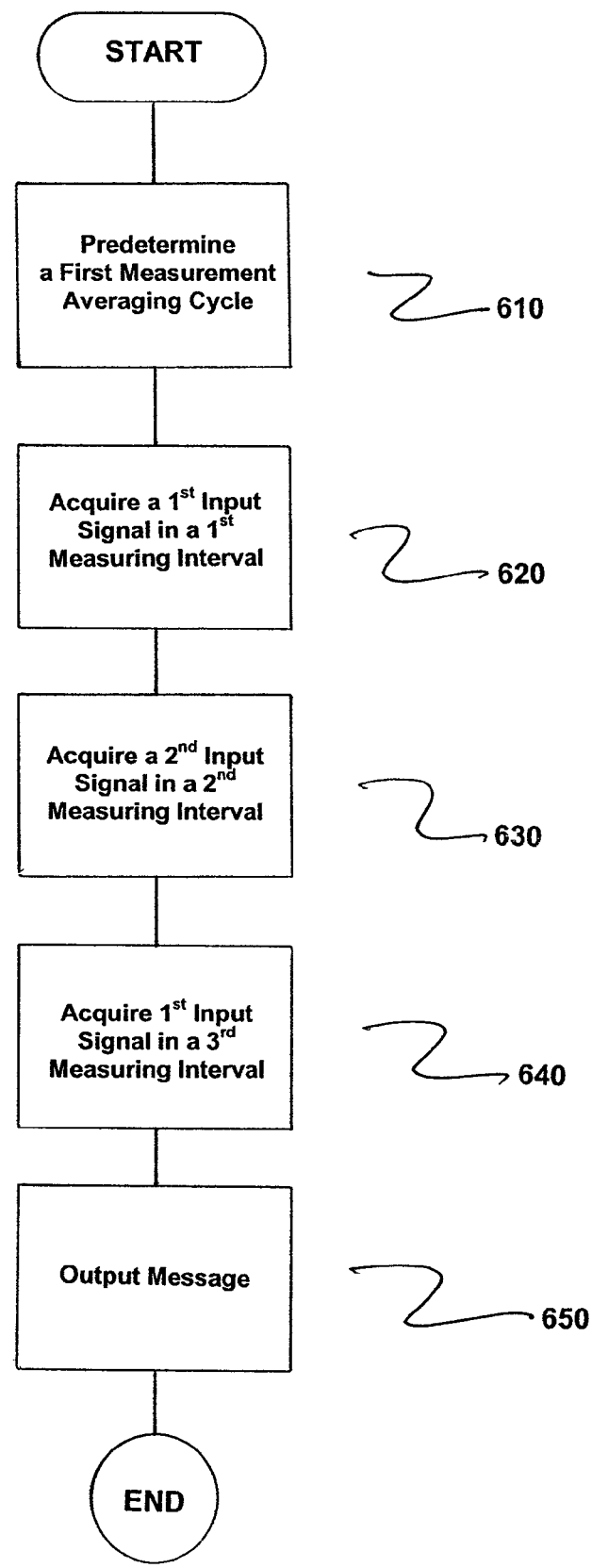
FIG. 6 is a flow chart of the method in accordance with an embodiment of the invention.

FIG. 6 is a flow chart of a method for accurately acquiring multiple analog input signals (S1-S3) that are converted using a plurality of A/D converters into corresponding digital single measured values (D1-D3). The method comprises predetermining, by a higher-order control unit, a first measurement averaging cycle (M1) having a predetermined total number (ZG) of measuring intervals (T), as indicated in step 610. Here, each of the plurality of A/D converters is switchable using at least one multiplexer to at least a part of the multiple analog input signals (S1-S3), and each of the plurality of A/D converters is activatable by the higher-order control unit.

Next, a first input signal (S1) is acquired in each of a first number (Z1) of measuring intervals (T) by a first A/D converter of the plurality of A/D converters and the first number (Z1) of measuring intervals (T) is averaged cumulatively by the higher-order control unit to form a first measured value (MW1), as indicated in step 620.

A second input signal (S2) is acquired in each of a lesser number (Z2) of measuring intervals (T) than the first number (Z1) of measuring intervals (T) by a second A/D converter of the plurality of A/D converters and the acquired second input signals (S2) are cumulatively averaged by the higher-order control unit to form a second measured value (MW2), as indicated in step 630.

The first input signal (S1) in a third number (Z3) of measuring intervals (T) is then acquired by the second A/D converter of the plurality of A/D convertors as at least one further single measured value (D1'), as indicted in step 640.

A message (M) is output if the deviation of the at least one further single measured value (D1') from the single measured value (D1) which is synchronously acquired by the first A/D converter and/or the first measured values (MW1') averaged up to that point exceeds a maximum admissible absolute value of the deviation, as indicated in step 650.

Thus, while there are shown, described and pointed out fundamental novel features of the invention as applied to preferred embodiments thereof, it will be understood that various omissions and substitutions and changes in the form and details of the illustrated apparatus, and in its operation, may be made by those skilled in the art without departing from the spirit of the invention. Moreover, it should be recognized that structures shown and/or described in connection with any disclosed form or embodiment of the invention may be incorporated in any other disclosed or described or suggested form or embodiment as a general matter of design choice.

The invention claimed is:

1. A method for accurately acquiring multiple analog input signals which are converted using a plurality of A/D converters into corresponding digital single measured values, the method comprising:
    predetermining, by a higher-order control unit, a first measurement averaging cycle having a predetermined total number of measuring intervals, each of said plural A/D converters being switchable using at least one multiplexer to at least a part of the input signals, each of said plural A/D converters being activateable by the control unit;
    acquiring, by a first A/D converter of said plural A/D converters, a first input signal in each of a first number of measuring intervals, and averaging cumulatively, by the higher-order control unit, the first input signals acquired within the first measurement averaging cycle to form a first measured value;
    acquiring, by a second A/D converter of said plural A/D converters, a second input signal in a second number of measuring intervals that is lesser than the first number of measuring intervals and cumulatively averaging, by the higher-order control unit, the second input signals acquired within the first measurement averaging cycle to form a second measured value;
    acquiring, by the second A/D converter of said plural A/D converters, the first input signal in a third number of measuring intervals as at least one further single measured value; and
    outputting a message if a deviation of the at least one further single measured value from one of a single measured value of the first input signal which is synchronously acquired by the first A/D converter and averaged first measured values exceed a maximum admissible absolute value of the deviation.

2. The method as claimed in claim 1, further comprising:
    predetermining, by the higher-order control unit, a second measurement averaging cycle having a same total number of measuring intervals as the first measurement averaging cycle, an allocation of said first and second A/D converters to the analog input signals being changed after each measurement averaging cycle.

3. The method as claimed in claim 2, wherein the at least one multiplexer is activated by the higher-order control unit such that, in addition to the second input signal, a third input signal or further input signals are acquired by the one of said first and second A/D converters that acquired the second input signal in remaining measuring intervals of a respective measurement averaging cycle and are cumulatively averaged by the higher-order control unit to form a third measured value or further input signals.

4. The method as claimed in claim 1, wherein the at least one multiplexer is activated by the higher-order control unit such that, in addition to the second input signal, a third input signal or further input signals are acquired by said second A/D converters in remaining measuring intervals of a respective measurement averaging cycle and are cumulatively averaged by the higher-order control unit to form a third measured value or further input signals.

5. The method as claimed in claim 1, further comprising:
    predetermining, by the higher-order control unit, at least one calibration cycle for each of said plural A/D converters after a predetermined number of measurement averaging cycles.

6. The method as claimed in claim 5, wherein an identical total number of measuring intervals, which corresponds to the measurement averaging cycles, is in each case predetermined by the higher-order control unit for a calibration cycle.

7. The method as claimed in claim 1, further comprising: alternately predetermining, by the higher-order control unit, a calibration cycle for the first or second A/D converter of said plural A/D convertors after a predetermined number of measurement averaging cycles.

8. The method as claimed in claim 1, wherein the first number of measuring intervals corresponds to the total number of measuring intervals in the first measurement averaging cycle.

9. The method as claimed in claim 1, wherein the third number of measuring intervals is a single one of the measuring intervals.

10. An analog input circuit, comprising:
electrical inputs for multiple analog input signals;
a measured value output for outputting measured values and a first single measured value;
a messaging output for outputting at least one message;
a higher-order control unit,
first and second A/D converters; and
at least one activateable multiplexer arranged at an input of each of said first and second A/D converters and configured to switch at least a part of the input signals to said each of said first and second A/D converters in response to the control unit;
the higher-order control unit being configured to predetermine a first measurement averaging cycle having a predetermined total number of measuring intervals;
the higher-order control unit being configured to activate each of said multiplexers and said first and second plural A/D converters so that said first A/D converter acquires a first input signal in each of a first number of measuring intervals in the first measurement averaging cycle, the second A/D converter acquires a second input signal in each of a second number of measuring intervals in the first measurement averaging cycle that is less than the first number of measuring intervals, and the second A/D converter acquires the first input signal as a further single measurement value in a third number of measuring intervals;
the higher-order control unit being configured to:
cumulatively average the first input signals acquired within the first measurement averaging cycle to form the first measured value;
cumulatively average the second input signals to form a second measured value; and
output a message via the messaging output if a deviation of the at least one further single measured value from one of a single measured value of the first input signals which is synchronously acquired by the first A/D converter and averaged first measured values exceed a maximum admissible absolute value of the deviation; and
the higher-order control unit further comprising an output device configured to output the measured values, the single measured values, and the message.

11. A measuring sensor having a plurality of sensor units for acquiring physical measured quantities, wherein the measuring sensor comprises at least one analog input circuit as claimed in claim 10 for acquiring corresponding analog input signals originating from respective ones of the plurality of sensor units.

12. The measuring sensor of claim 11, wherein the physical measured quantities comprise at least one of pressure, force and temperature.

13. A measuring transducer having a plurality of sensor units for acquiring physical measured quantities, wherein the measuring transducer comprises at least one analog input circuit as claimed in claim 10 for acquiring corresponding analog input signals originating from respective ones of the plurality of sensor units.

14. The measuring transducer of claim 13, wherein the measuring transducer is configured for operation in a two-core current loop.

15. The measuring transducer of claim 13, wherein the physical measured quantities comprise at least one of pressure, force and temperature.

* * * * *